Dec. 13, 1927.
W. H. COLE
1,652,559
PROTECTIVE RELAY SYSTEM
Filed Jan. 23, 1925
2 Sheets-Sheet 1
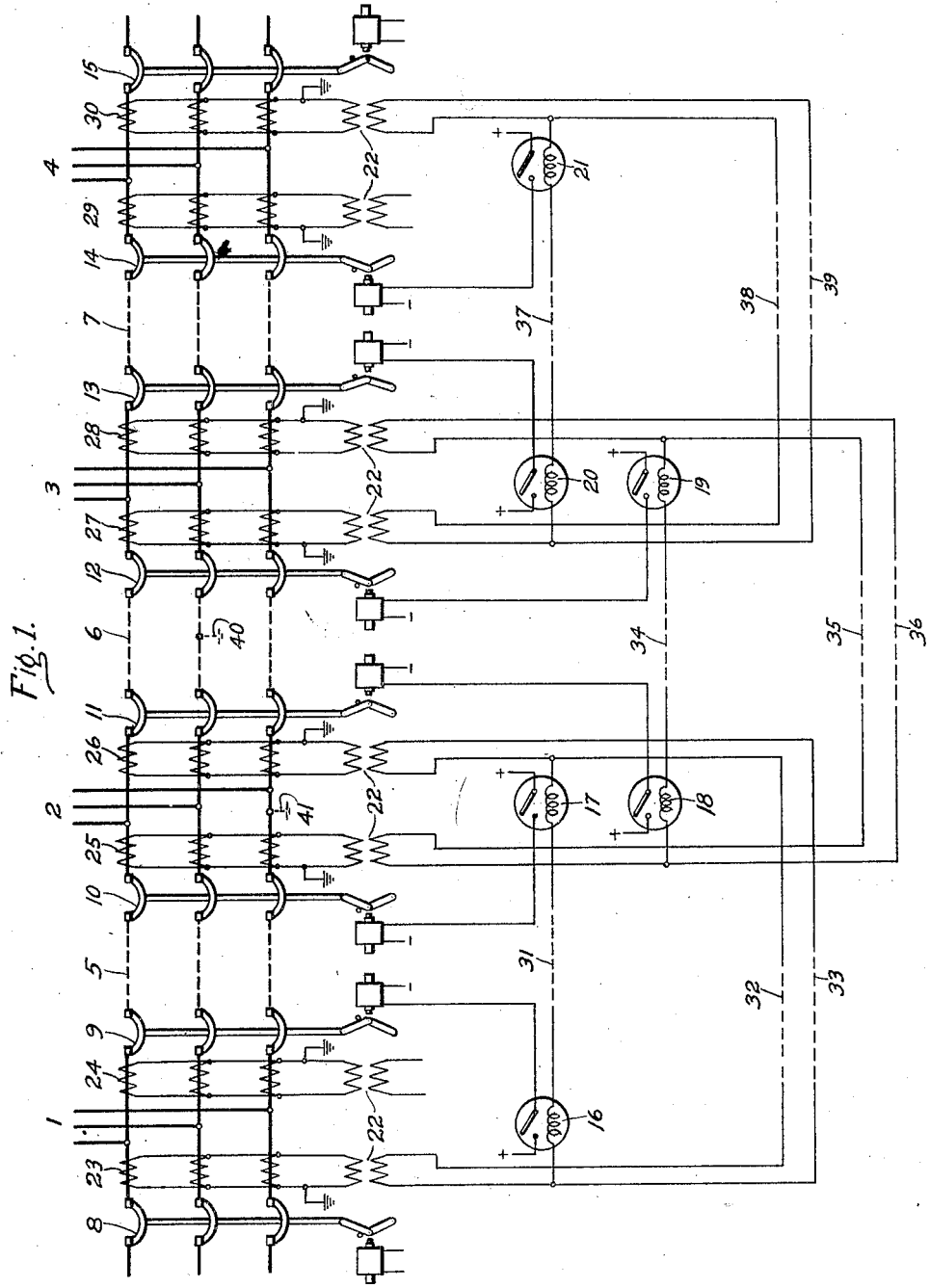
WITNESSES:
INVENTOR
William H. Cole.
BY
Wesley G. Carr
ATTORNEY

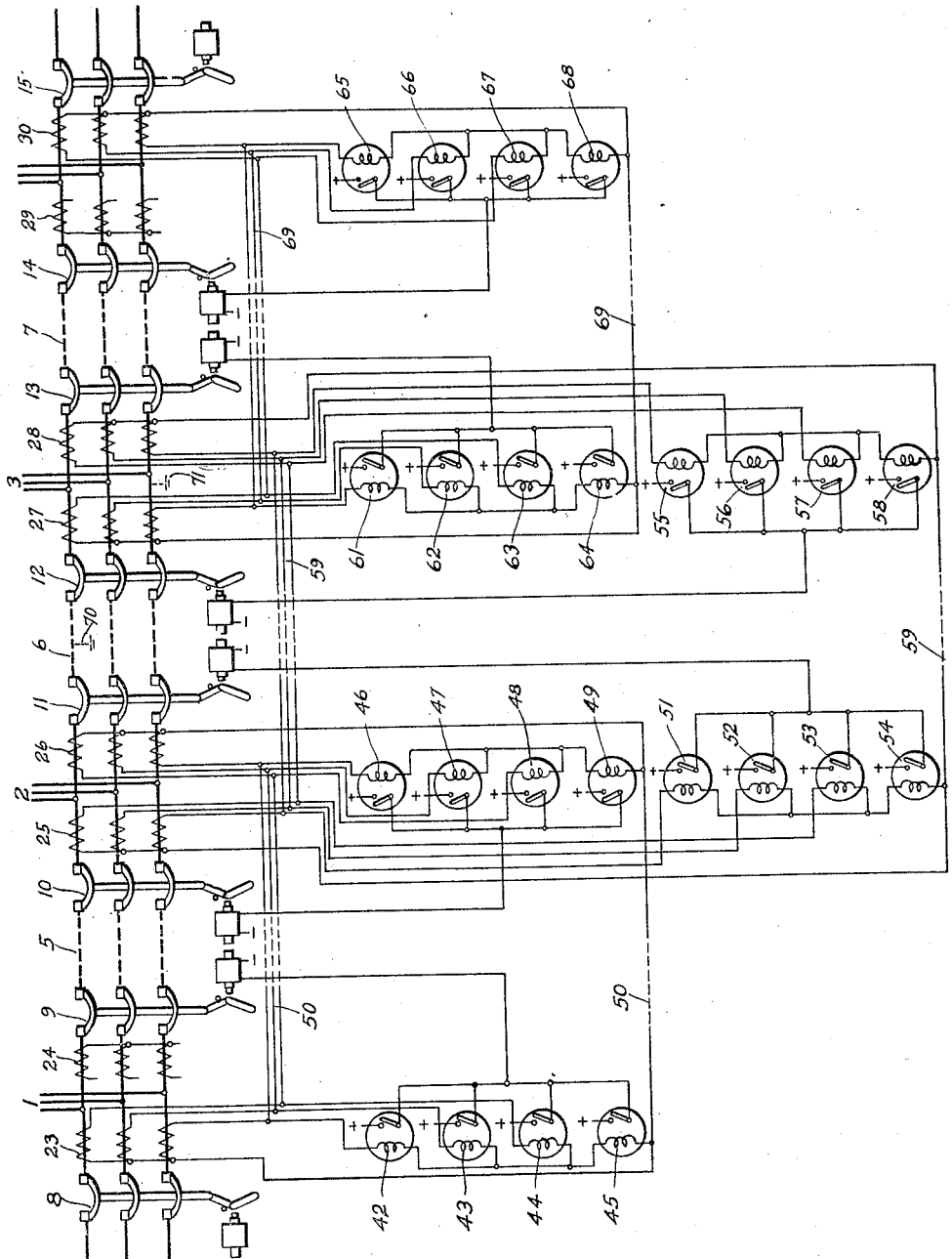

Patented Dec. 13, 1927.

1,652,559

UNITED STATES PATENT OFFICE.

WILLIAM H. COLE, OF ABINGTON, MASSACHUSETTS, ASSIGNOR TO WESTINGHOUSE ELECTRIC & MANUFACTURING COMPANY, A CORPORATION OF PENNSYLVANIA.

PROTECTIVE RELAY SYSTEM.

Application filed January 23, 1925. Serial No. 4,246.

My invention relates to protective relay systems, and particularly to relay systems for the protection of the bus bars and feeders of a distribution network.

An object of my invention is to provide, in a distribution system, comprising station bus bars and feeder circuits extending therefrom, protective relays that shall be responsive to faults occurring on either the bus bars or feeder circuits.

Another object of my invention is to provide a distribution system comprising bus bars, incoming and outgoing feeders connected thereto through circuit-interrupters and means for actuating the circuit-interrupters to disconnect one or both of the feeder circuits, depending upon whether a fault occurs in one of the feeder circuits or upon the bus bars.

A further object of my invention is to provide a distribution system comprising a plurality of bus and feeder sections in series and means for selectively disconnecting either a bus section or feeder section from the system when it develops a fault.

In accordance with my invention, a distribution system comprising one or more bus sections and feeder sections connected thereto is provided with protective relays so connected to the feeder sections and to circuit-interrupters that either a bus or a feeder section is disconnected if a fault occurs thereon. The windings of the protective relays are preferably connected in overlapping balanced relation, pilot wires being employed to connect the balanced portions of the relay circuits.

In the accompanying drawing, Figure 1 is a diagrammatic view of a distribution system embodying my invention, and Fig. 2 is a similar view of a modification of my invention.

Referring to Fig. 1, a three-phase distributing system comprises a plurality of bus sections 1, 2, 3 and 4 connected in series by a plurality of feeder sections 5, 6 and 7 to form the usual radial distribution system. If desired, the bus sections 1 and 4 may be connected together to form the usual ring-type system. The bus sections 1 to 4, inclusive, are usually located in separate stations at which power is either supplied or taken from the system. The feeder sections 5, 6 and 7 inter-connect the respective stations in order to permit the exchange of power between the stations.

Circuit-interrupters 8 to 15, inclusive, are disposed at the ends of the feeder sections to permit the disconnection of the feeder circuits from the stations. Relays 16 to 21, inclusive, controlling the circuit-interrupters are connected to the system at the ends of the respective feeder circuits. Associated with each relay is a transformer 22 connected to sets of current transformers 23 to 30, inclusive, at the ends of the feeder circuits. Each set of current transformers comprises a transformer in each phase of the distribution circuit that is so connected in parallel to the primary windings of the transformers 22 that, under normal conditions, no current traverses the latter. In case a conductor becomes grounded, however, the currents traversing the transformers in the respective phases of the circuit no longer cancel and a current traverses the transformer 22 for energizing the associated relays.

Relays 16 and 17 are connected across normally equipotential points in the circuit of the transformers 22 through pilot wires 31, 32 and 33. Relays 18 and 19 and relays 20 and 21 are similarly connected through pilot wires 34, 35 and 36 and 37, 38 and 39, respectively. The pairs of relays are connected to the circuit in overlapping relation, relays 16 and 17 being connected to the first and fourth sets of current transformers 23 and 26, as shown. The other pairs of relays are similarly connected to the circuit at the opposite sides of adjacent stations. The relays 16 and 17 are adapted to actuate the circuit-interrupters 9 and 10, and relays 18, 19, 20 and 21 are respectively adapted to actuate the circuit-interrupters 11, 12, 13 and 14. In the case of a fault which energizes the relays 16 and 17, both circuit-interrupters 9 and 10 are actuated to disconnect the feeder section 5 from the circuit.

Assuming that a fault occurs on the feeder section 6, such as the grounding of one of the conductors as indicated at 40, the currents in the sets of transformers 25 and 28 become unbalanced and the relays 18 and 19 are energized. The transformers 22 associated with these two sets of current transformers 25 and 28 are not equally energized because of the fact that the two sets are on opposite sides of the fault and power flows from both directions to the fault. Accordingly, current circulates from the transformers 22 through the pilot wires 34, 35 and 36 and the windings of the relays 18 and 19. The relays 18 and 19 close their respective contacts and actuate the circuit interrupters 11 and 12 to disconnect the faulty feeder section from the circuit.

Under certain conditions, the other sets of current transformers 23, 24, etc., will also be unbalanced by the ground current and energize the associated transformers 22. However, the sets of transformers 23 and 26 are disposed on the same side of the fault, and the sets of transformers 27 and 30 are likewise both disposed on the same side of the fault. Accordingly, the energization of the associated transformers 22 is equal and opposite and substantially no current traverses the relays 16, 17, 20 and 21.

Assuming that a fault occurs on the bus section 2, such as a grounded bus bar as indicated at 41, the sets of transformers 23 and 26 and 25 and 28, being located on opposite sides of the fault, cause the energization of the relays 16, 17, 18 and 19. The operation of these relays actuates the circuit interrupters 9, 10, 11, and 12, thereby disconnecting the faulty bus section from the circuit. The operation of the protective system for faults occurring on the other bus or feeder sections is substantially the same as described above.

It will be seen that I have provided a protective system that will be effective against faults occurring upon either bus or feeder sections. In the case of a fault on a feeder section, only the faulty section is disconnected from the system, leaving the bus sections at either end unaffected.

In Fig. 2, I have shown a modification of my invention comprising a series of bus sections 1 to 4, inclusive, connected by feeder sections 5, 6 and 7, as before. Circuit-interrupters 8 to 15, inclusive, are provided for disconnecting the bus and feeder sections. Sets of current transformers 23 to 30, inclusive, are provided at the ends of the respective feeder sections. Three overload relays 42, 43 and 44 and a ground relay 45 are connected to the set of current transformers 23. The relays 42 to 45, inclusive, are connected to relays 46 to 49 associated with the set of current transformers 26 through the pilot wires 50. Similar sets of relays 51 to 58, inclusive, and 61 to 68, inclusive, are associated with the sets of transformers 25, 28 and 27, 30 respectively, through the pilot wires 59 and 69. The sets of relays respectively control the circuit-interrupters 9 and 10, 11 and 12 and 13 and 14 at the ends of the respective feeder sections 5, 6 and 7.

Assuming that a fault occurs on feeder section 6, as indicated at 70, the sets of current transformers 25 and 28, being on opposite sides of the fault, cause the energization of certain of the relays in the groups 51 to 54 and 55 to 58, depending upon which phases of the circuit are involved, whereupon the circuit-interrupters 11 and 12 are actuated to disconnect the faulty feeder section from the system. The sets of current transformers associated with the relay groups 42 to 45, 46 to 49, 61 to 64 and 65 to 68 are not unbalanced because each pair of connected groups is on the same side of the fault. Consequently, the circuit-interrupters 9 and 10 and 13 and 14 are not affected.

Assuming that a fault occurs on the bus section 3, as indicated at 71, both sets of current transformers 27, 30 and 25, 28 become energized and cause the energization of one or more relays in each of the groups 51 to 54, 55 to 58, 61 to 64 and 65 to 68, whereupon the circuit interrupters 11, 12, 13 and 14 are actuated to disconnect the faulty bus section from the system.

I do not consider that my invention is limited to the type of distribution system that I have shown, nor to the specific relay connections illustrated. Accordingly, I do not wish it to be limited in scope, except as indicated in the appended claims.

I claim as my invention:

1. An electrical distribution system comprising a plurality of bus and feeder sections in series, a plurality of relays, and means connecting them in overlapping relation to the remote ends of adjacent sections, and circuit-interrupters between said sections controlled by said relays.

2. An electrical distribution system comprising a plurality of bus and feeder sections in series, circuit-interrupters at the ends of said feeder sections, relays connected to the sections and pilot wires connecting said relays associated with the remote ends of adjacent sections together.

3. In an electrical distribution system, the combination with a plurality of sections, current transformers at the ends of the sections, pilot wires so connecting the transformers that the pilot circuits thus constituted overlap, and electro-responsive devices so connected to the pilot circuits as to be responsive to faults in any portion of any section of the system.

4. In an electrical distribution system, the combination with a plurality of feeder sections connected in series relation and circuit-interrupters disposed between the respective sections, of current transformers at the ends of the sections, pilot wires so connecting the transformers that the pilot circuits thus constituted overlap and means connected to the pilot circuits for tripping certain of the interrupters upon the occurrence of a fault upon any of the sections of the distribution system.

5. An electrical distribution system comprising two feeder sections connected in series relation through a bus section, protective devices, and means for so connecting said devices in overlapping relation to the remote ends of adjacent sections that they will be operated by an unbalance in the energy traversing these points of the system.

In testimony whereof, I have hereunto subcribed my name this tenth day of January 1925.

WILLIAM H. COLE.